Patented Oct. 21, 1947

2,429,573

UNITED STATES PATENT OFFICE 2,429,573

TETRAPENTAERYTHRITOL DECANITRATE AND AMMONIUM NITRATE EXPLOSIVE

Joseph A. Wyler, Allentown, Pa., assignor to Trojan Powder Company, Allentown, Pa.

No Drawing. Application June 18, 1945, Serial No. 600,213

2 Claims. (Cl. 52—11)

This invention is a continuation-in-part of my application S. N. 539,197, filed June 7, 1944. The invention relates to a new safety explosive. More specifically it relates to an ammonium nitrate-tetrapentaerythritol-decanitrate explosive.

Tetrapentaerythritol decanitrate has the formula:

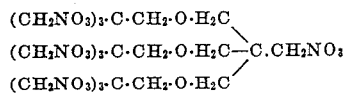

or $C_{20}H_{32}O_3(NO_3)_{10}$ and is normally a solid.

Certain subject matter herein disclosed but not claimed is claimed in my copending application Serial No. 650,387, filed February 26, 1946, for Tetrapentaerythritol decanitrate.

An object of this invention is to prepare decanitrate of tetrapentaerythritol explosives. Other and further objects will become apparent upon a perusal of this specification.

I have found that tetrapentaerythritol

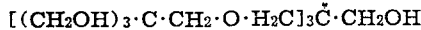

can be nitrated to the decanitrate and that the latter is useful as an explosive, particularly in association with ammonium nitrate.

The tetrapentaerythritol used for the preparation of the decanitrate may be prepared by fractional crystallization of the impure pentaerythritol usually obtained in industry and referred to in the beginning of my copending application of S. N. 543,485, filed July 4, 1944. As mentioned in the latter application tetrapentaerythritol is difficulty soluble in cold water and only slightly more soluble in hot water. It may be recovered by fractional crystallization from water and is distinguished from tripentaerythritol, with which it is usually associated, by its melting point of about 234° C. as against a melting point of 249–250° C. for tripentaerythritol. Tetrapentaerythritol in crude form is disclosed in lines 3 to 36 of page 1, column 2 of U. S. Patent 2,356,745, issued to Barth and Burrell.

My new explosive was prepared as follows:

1 part of tetrapentaerythritol was added slowly, with stirring, to about 10 parts of 98% $HNO_3$, at a temperature of —5° to +5° C. and the mixture stirred for about 20 minutes longer. This stirring resulted in a clear solution. The latter was then run, with stirring, into about five times its weight of ice and water which caused the precipitation of the decanitrate as a semi-viscous liquid. The latter was washed with successive portions of cold water, then with a 1% water solution of ammonium carbonate and finally with water.

The nitrated product was still a liquid at this stage and was separated from the aqueous layer by settling. It was then dissolved in acetone, then treated with an equal volume of ethyl alcohol and the acetone slowly driven off. This caused the tetrapentaerythritol decanitrate to separate as distinct, hard crystals, which were filtered off, washed with alcohol and dried at 50° C.

The process described above is given merely as one method for the preparation of the tetrapentaerythritol decanitrate and it is understood that I may use other processes for the preparation of this compound.

The nitrate nitrogen content of tetrapentaerythritol decanitrate prepared as described above is usually about 14.67% N, whereas the theoretical content is 14.89% N.

The properties of my tetrapentaerythritol decanitrate prepared as above are as follows: color—white; melting point—approx. 70° C.; very soluble in ethylene dichloride and in acetone; slightly soluble in ethyl alcohol, benzene and chloroform and insoluble in ethyl ether. The heat stability is good. Molecular weight—975 (theory: 940.54).

It is very insensitive to impact. A 2 kg. weight dropped 100 cms. does not effect its detonation. The decanitrate has excellent safety characteristics.

Due to its low melting point combined with its impact and safety properties it has distinct advantages over pentaerythrite tetranitrate, dipentaerythritol hexanitrate and tripentaerythritol octanitrate in association with latent explosives such as ammonium nitrate or ammonium nitrate combined with other oxidizing agents such as $NaNO_3$ and the like. Also, when molten, the decanitrate forms a liquid which is distinctly more adhesive toward salts, as, for example, ammonium nitrate, sodium nitrate and the like and therefore serves as a superior water-proofing agent for explosives comprising ammonium nitrate.

Tetrapentaerythritol decanitrate is an excellent sensitizer for ammonium nitrate when used in amounts of about 5 parts to about 35 parts for each 100 parts, by weight, of ammonium nitrate, particularly if the decanitrate is coated upon the crystals of the latter. I prefer to use the decanitrate in explosives containing a major amount of ammonium nitrate.

I claim:

1. A safety explosive comprising particles of ammonium nitrate and tetrapentaerythritol decanitrate in minor proportion disposed as a coating over the said particles and serving as a sensitizer therefor.

2. A safety explosive comprising particles of ammonium nitrate and tetrapentaerythritol decanitrate in the proportion of 5 to 35 parts for 100 parts by weight of ammonium nitrate.

JOSEPH A. WYLER.

REFERENCES CITED

The following references are of record in the file of this patent:

UNITED STATES PATENTS

| Number | Name | Date |
|---|---|---|
| 2,353,147 | Cook et al. | July 11, 1944 |
| 2,294,592 | Wyler | Sept. 1, 1942 |
| 2,389,228 | Wyler | Nov. 20, 1945 |